United States Patent
Zhang et al.

(10) Patent No.: US 9,420,273 B2
(45) Date of Patent: Aug. 16, 2016

(54) ARRAY SUBSTRATE, 3D DISPLAY DEVICE AND DRIVING METHOD FOR THE SAME

(71) Applicants: BOE TECHNOLOGY GROUP CO., LTD., Beijing (CN); BEIJING BOE DISPLAY TECHNOLOGY CO., LTD., Beijing (CN)

(72) Inventors: Liang Zhang, Beijing (CN); Xibin Shao, Beijing (CN); Dan Wang, Beijing (CN); Weihao Hu, Beijing (CN); Yizhen Xu, Beijing (CN); Shuai Hou, Beijing (CN)

(73) Assignees: BOE TECHNOLOGY GROUP CO., LTD. (CN); BEIJING BOE DISPLAY TECHNOLOGY CO., LTD. (CN)

( * ) Notice: Subject to any disclaimer, the term of this patent is extended or adjusted under 35 U.S.C. 154(b) by 87 days.

(21) Appl. No.: 14/066,761

(22) Filed: Oct. 30, 2013

(65) Prior Publication Data

US 2014/0160111 A1    Jun. 12, 2014

(30) Foreign Application Priority Data

Dec. 10, 2012   (CN) .......................... 2012 1 0530624

(51) Int. Cl.
| | | |
|---|---|---|
| G09G 5/00 | (2006.01) | |
| H04N 13/04 | (2006.01) | |
| G09G 3/00 | (2006.01) | |
| G09G 3/36 | (2006.01) | |

(52) U.S. Cl.
CPC ........... *H04N 13/0497* (2013.01); *G09G 3/003* (2013.01); *G09G 3/3677* (2013.01); *G09G 2310/0224* (2013.01); *G09G 2310/0281* (2013.01); *G09G 2320/0209* (2013.01)

(58) Field of Classification Search
CPC ................ G09G 3/003; G09G 3/3677; G09G 2310/0224; G09G 2310/0281; H04N 13/0495; H04N 13/0497
See application file for complete search history.

(56) References Cited

U.S. PATENT DOCUMENTS

| | | | | |
|---|---|---|---|---|
| 2008/0007514 A1* | 1/2008 | Tanaka | ........................ | 345/102 |
| 2008/0012819 A1 | 1/2008 | Lee et al. | | |
| 2008/0079685 A1* | 4/2008 | Umezaki | .............. | G09G 3/3677 345/100 |
| 2009/0102764 A1* | 4/2009 | Chen et al. | ...................... | 345/87 |
| 2010/0118221 A1* | 5/2010 | Kim et al. | ...................... | 349/39 |
| 2011/0164076 A1* | 7/2011 | Lee | ............................... | 345/691 |

(Continued)

FOREIGN PATENT DOCUMENTS

| | | |
|---|---|---|
| CN | 1367611 A | 9/2002 |
| CN | 101105585 | 1/2008 |

(Continued)

OTHER PUBLICATIONS

Office Action issued in corresponding Chinese Application No. 2012105306245 dated Sep. 24, 2014.
Office Action issued in corresponding Chinese Application No. 2012105306245 dated Feb. 13, 2015.
European Search Report issued in corresponding European Application No. 13188865 dated Jan. 28, 2014.

(Continued)

*Primary Examiner* — Joe H Cheng
(74) *Attorney, Agent, or Firm* — Baker Hostetler LLP

(57) ABSTRACT

According to embodiments of the present invention, the gate lines of the array substrate receive the gate scanning signal in a preset time period. Specifically, the gate lines of pixel units in odd rows are receiving the gate scanning signal in the first time interval of the preset time period, and the gate lines of pixel units in even rows are receiving the gate scanning signal in the second time interval of the preset time period.

5 Claims, 3 Drawing Sheets

(56) References Cited

U.S. PATENT DOCUMENTS

| | | | |
|---|---|---|---|
| 2011/0261034 A1* | 10/2011 | Tsuchida et al. | 345/204 |
| 2012/0086707 A1* | 4/2012 | Li et al. | 345/419 |
| 2012/0113237 A1* | 5/2012 | Izawa | 348/55 |
| 2012/0120121 A1 | 5/2012 | Yoshida et al. | |
| 2012/0188290 A1* | 7/2012 | Park et al. | 345/690 |
| 2012/0249615 A1* | 10/2012 | Lee | 345/691 |
| 2013/0027525 A1* | 1/2013 | Kitayama | G02B 27/2264 348/54 |
| 2013/0100122 A1* | 4/2013 | Moon | G09G 3/003 345/419 |
| 2013/0181968 A1 | 7/2013 | Uemura et al. | |
| 2013/0257925 A1* | 10/2013 | Kim | H04N 13/0434 345/691 |
| 2014/0160098 A1* | 6/2014 | Zhang et al. | 345/204 |
| 2015/0103069 A1* | 4/2015 | Zhang | G09G 3/003 345/214 |

FOREIGN PATENT DOCUMENTS

| | | |
|---|---|---|
| CN | 101763809 | 6/2010 |
| CN | 102467895 | 5/2012 |
| CN | 202956570 | 5/2013 |
| EP | 2741275 A1 * | 11/2014 |
| WO | 2012039328 | 3/2012 |

OTHER PUBLICATIONS

Notice of Reasons for Rejection issued in corresponding Korean Application No. 10-2013-0146264 dated Sep. 28, 2014.

Third Office Action issued in corresponding Chinese Application No. 2012105306245 dated Jun. 25, 2015.

Office Action in Chinese Patent Application No. 201210530624.5, dated Dec. 15, 2015.

* cited by examiner

ARRAY SUBSTRATE, 3D DISPLAY DEVICE AND DRIVING METHOD FOR THE SAME

CROSS REFERENCE OF RELATED APPLICATIONS

The present application claims priority to and incorporates by reference the entire contents of Chinese priority document 201210530624.5, filed in China on Dec. 10, 2012.

BACKGROUND OF THE INVENTION

1. Field of the Invention

The present invention relates to a field of 3D displaying, and more particular to an array substrate, a 3D display device and a driving method for the same.

2. Description of the Prior Art

With the development of displaying technology, the 3D display technology has become one of important technologies for the display device. An active shutter 3D display technology may implement the 3D displaying with low cost. A 3D effect is achieved by improving the refresh rate of the picture, and both eyes of a viewer may see the corresponding images for the left eye and the right eye respectively by the fast switching of the 3D glasses, so that the effect of stereo (three-dimensional) pictures can be achieved.

Due to the requirement of receiving the continuous image by human eyes, each eye should be provided with at least 60 Hz image. And thus the refresh rate of the display device should achieve 120 Hz. Accordingly, the drive frequency of the drive circuit of the display device is also required to be increased to 120 Hz. As a result, a charging time for each pixel electrode is reduced. For ensuring the charging rate of the pixel electrodes, the width of the conducting wires in the display device is often required to be increased to reduce the load of the display device, which may reduce the transmittance of the display device. Furthermore, the yield rate of the display device production with high refresh rate is low. And thus the cost of the production increases.

SUMMARY OF THE INVENTION

The technical problem to be solved by the present invention lies in providing an array substrate, a 3D display device and a driving method for the same, which may improve the refresh rate of the display device while ensuring the charging duration of the pixel electrodes and implementing 3D displaying.

The embodiments of the present invention provide the following technical solutions for solving the above technical problems.

According to an aspect of the present invention, it is provided an array substrate, comprising: a substrate, 2n rows of pixel units being arranged on the substrate in a matrix form. The array substrate may further comprise gate lines each of which corresponds to each row of the pixel units. And each of the gate lines may be coupled to gates of thin film transistors (TFTs) in corresponding pixel units.

Further, The gate lines may receive a gate scanning signal in a preset period, wherein the gate lines corresponding to the $2k-1^{th}$ rows of pixel units receive the gate scanning signal in a first time interval of the preset time period, and the gate lines corresponding to the $2k^{th}$ row of pixel units receive the gate scanning signal in a second time interval of the preset time period, where n is a natural number and k is a natural number which is not less than 1 and not greater than n.

Further, within the preset time period, the first time interval may precede the second time interval, or the second time interval may precede the first time interval.

Further, each of the gate lines corresponding to the $1^{st}$ row, the $3^{rd}$ row, ..., the $2k-1^{th}$ row, ..., the $2n-1^{th}$ row of pixel units may receive the gate scanning signal in turn in the first time interval.

And each of the gate lines corresponding to the $2^{nd}$ row, the $4^{th}$ row, ..., the $2k^{th}$ row, ..., the $2n^{th}$ row of pixel units may receive the gate scanning signal in turn in the second time interval.

Further, a time length of each of the first time interval and the second time interval may be substantially $\frac{1}{120}$ s.

According to another aspect of the present invention, it is provided a 3D display device, comprising one of the above array substrates and a driving circuit.

Further, the driving circuit may comprises: a first gate drive circuit, being configured to provide the gate scanning signal to gate lines corresponding to the $2k-1^{th}$ rows of pixel units in the first time interval of the preset time period; and a second gate drive circuit, being configured to provide the gate scanning signal to gate lines corresponding to the $2k^{th}$ rows of pixel units in the second time interval of the preset time period.

Further, the gate lines corresponding to the $2k-1^{th}$ rows of pixel units may be coupled to the first gate driving circuit; and the gate lines corresponding to the $2k^{th}$ rows of pixel units may be coupled to the second gate driving circuit.

According to another aspect of the present invention, it is also provided a driving method for one of the above 3D display devices, comprising: transmitting the gate scanning signal to gate lines corresponding to the $2k-1^{th}$ rows of pixel units in the first time interval of the preset time period; and transmitting the gate scanning signal to gate lines corresponding to the $2k^{th}$ rows of pixel units in the second time interval of the preset time period.

Further, within the preset time period, the first time interval may precede the second time interval, or the second time interval may precede the first time interval.

Further, transmitting the gate scanning signal to the gate lines corresponding to the $2k-1^{th}$ rows of pixel units in the first time interval of the preset time period may comprise: transmitting the gate scanning signal to each of the gate lines corresponding to the $1^{st}$ row, the $3^{rd}$ row, ..., the $2k-1^{th}$ row, ..., the $2n-1^{th}$ row of pixel units in turn in the first time interval.

Further, transmitting the gate scanning signal to the gate lines corresponding to the $2k^{th}$ rows of pixel units in the second time interval of the preset time period may comprise: transmitting the gate scanning signal to each of the gate lines corresponding to the $2^{nd}$ row, the $4^{th}$ row, the $2k^{th}$ row, ..., the $2n^{th}$ row of pixel units in turn in the second time interval.

Further, transmitting the gate scanning signal to the gate line corresponding to the $2k-1^{th}$ row of pixel units in the first time interval of the preset time period may comprise: not transmitting the gate scanning signal to the gate line corresponding to the $2k^{th}$ row of pixel units in the first time interval of the preset time period.

Further, transmitting the gate scanning signal to the gate line corresponding to the $2k^{th}$ row of pixel units in the second time interval of the preset time period may comprise: not transmitting the gate scanning signal to the gate line corresponding to the $2k-1^{th}$ row of pixel units in the second time interval of the preset time period.

The embodiments of the present invention have the following beneficial effects: in the above solutions, the gate lines of the array substrate receive the gate scanning signal in the preset time period, wherein the gate lines of pixel units in odd rows are receiving the gate scanning signal in the first time interval of the preset time period, and the gate lines of pixel units in even rows are receiving the gate scanning signal in the second time interval of the preset time period. Thus, the gates of the pixel units in even rows and odd rows are charged respectively by turning on the gate driving circuit at intervals, which results in that the charging duration of the array substrate can be reduced. And it can improve the refresh rate of the display device while ensuring the charging duration of the pixel electrodes and implementing 3D displaying.

DETAILED DESCRIPTION OF THE PREFERRED EMBODIMENTS

In the following, the explanation will be made in details in associated with figures and specific embodiment to further clarify the technical problems to be solved by the embodiments of the present invention, the technical solutions and the advantages.

The embodiments of the present invention provides an array substrate, a 3D display device and a driving method for the same, which may improve the refresh rate of the display device while ensuring the charging duration of the pixel electrodes and implementing 3D displaying.

Figure 1:
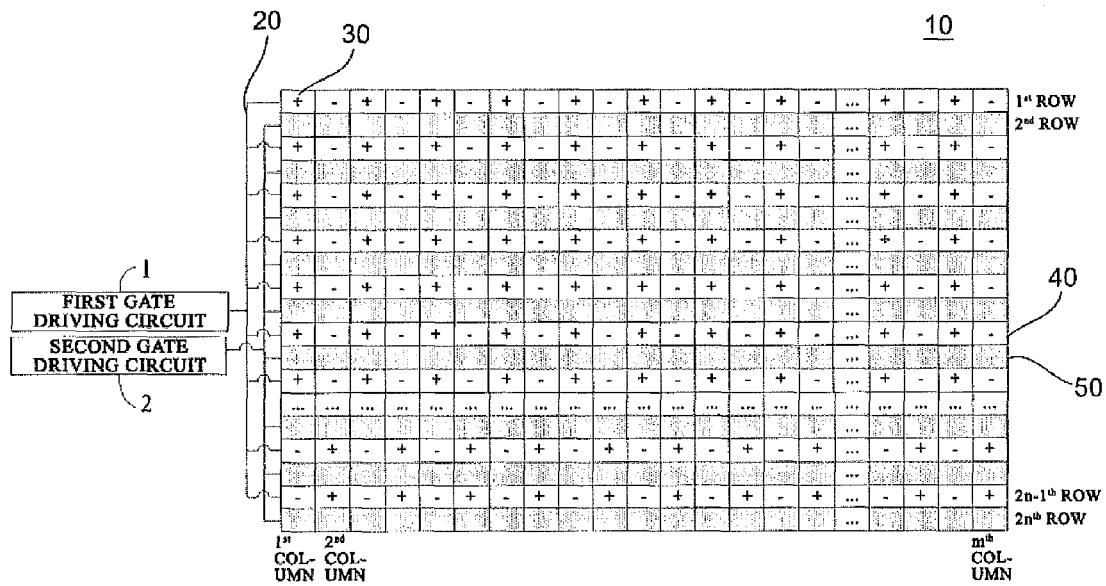
FIG. 1 illustrates a diagram for displaying for the left eye by a 3D display device according to an embodiment of the present invention.
Figure 2:
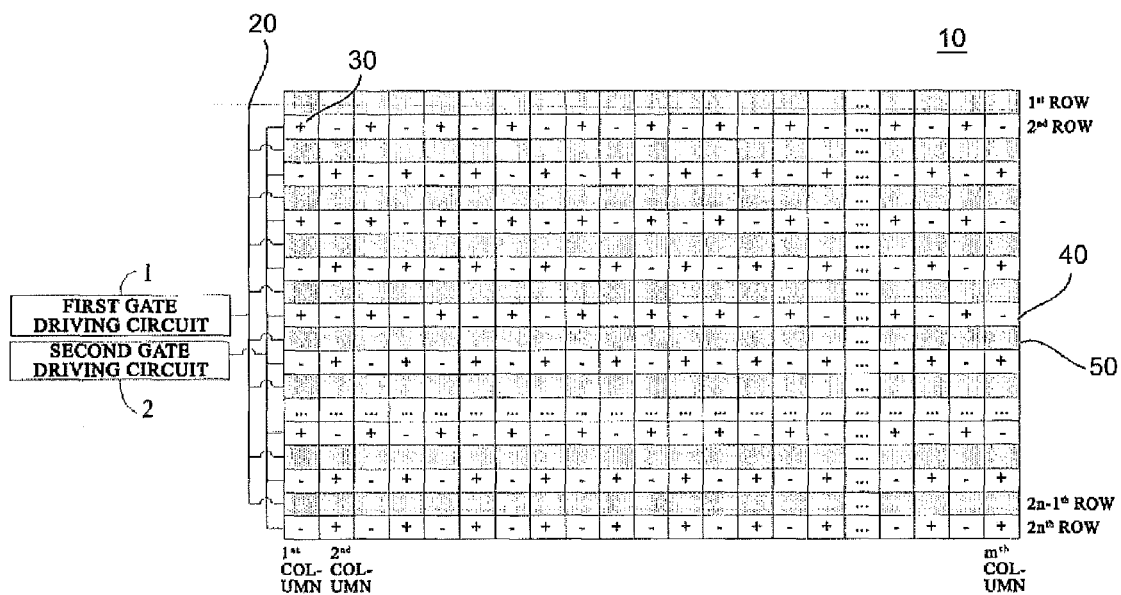
FIG. 2 illustrates a diagram for displaying for the right eye by the 3D display device according to an embodiment of the present invention.

An embodiment of the present invention provides an array substrate, as shown in FIGS. 1 and 2, comprising: a substrate 10, 2n rows of pixel units being arranged on the substrate 10 in a matrix form. The array substrate further comprises gate lines 20 corresponding to each row of the pixel units, and each of the gate lines is coupled to the gate of thin film transistor 30 in corresponding pixel unit.

As shown in FIGS. 1 and 2, the gate line receives a gate scanning signal in a preset period, wherein the gate line corresponding to the $2k-1^{th}$ row of pixel units 40 receives the gate scanning signal in a first time interval of the preset time period. And the gate line corresponding to the $2k^{th}$ row of pixel units 50 receives the gate scanning signal in a second time interval of the preset time period, where n is a natural number and k is a natural number which is not less than 1 and not greater than n.

Here, in the preset time period, the first time interval may precede the second time interval or the second time interval may precede the first time interval.

When the refresh rate of the display device is 60 Hz and it is assumed that 1126 rows of pixel units are arranged on the array substrate, the turn-on duration for each row of the pixel units is 1/(1126*60) s (approximately equivalent to 14.8 us) by progressive driving scan. For implementing 3D displaying, the refresh rate of the display device is required to be increased to 120 Hz, which results in that the charging duration of the pixel electrodes is reduced. In prior arts, the widths of the conducting wires on the array substrate are often required to be increased to reduce the load of the display device for ensuring the charging rate of the pixel electrodes. However, such means may reduce the transmittance of the display device. Moreover, the response time of the display device with high refresh rate is insufficient, which leads to poor image quality.

In the technical solutions of the present invention, the gate lines are provided with the gate scanning signal in the preset time period for solving the above problem. Here, the gate lines in odd rows receive the gate scanning signal in the first time interval of the preset time period, while the gate lines in even rows do not receive the gate scanning signal in the first time interval. On the other hand, the gate lines in even rows receive the gate scanning signal in the second time interval of the preset time period, while the gate lines in odd rows do not receive the gate scanning signal in the second time interval.

In the embodiments of the present invention, the length of the preset time period is substantially $\frac{1}{60}$ s, and the time length of each of the first time interval and the second time interval is substantially $\frac{1}{120}$ s.

In the first time interval of the preset time period, the image is provided to the left eye of the viewer by switching of the active shutter glasses. During this time interval, each of the gate lines corresponding to the $1^{st}$ row, the $3^{rd}$ row, ..., the $2k-1^{th}$ row, ..., the $2n-1^{th}$ row of pixel units receives the gate scanning signal in turn, which results in that the image displaying by the pixel units in odd rows is implemented. In the meantime, the gate lines corresponding to the $2^{nd}$ row, the $4^{th}$ row, ..., the $2k^{th}$ row, ..., the $2n^{th}$ row of pixel units do not receive the gate scanning signal, i.e. the display of the pixel units in even rows is in black.

In the second time interval of the preset time period, the image is provided to the right eye of the viewer by switching of the active shutter glasses. During this time interval, each of the gate lines corresponding to the $2^{nd}$ row, the $4^{th}$ row, ..., the $2k^{th}$ row, ..., the $2n^{th}$ row of pixel units receives the gate scanning signal in turn, which results in that the image displaying by the pixel units in even rows is implemented. In the meantime, the gate lines corresponding to the $1^{st}$ row, the $3^{rd}$ row, ..., the $2k-1^{th}$ row, ..., the $2n-1^{th}$ row of pixel units do not receive the gate scanning signal, i.e. the display of the pixel units in odd rows is in black.

In the above processes, the data drive circuit of the array substrate normally provides data signal to the data lines of the pixel units. However, the TFTs of the pixel units will not be turned on until the gate scanning signal is received by the gate line corresponding to the pixel units. Therefore, the pixel units may not display an image, i.e., display in black.

In the above solutions, the array substrate may refresh the image 120 times within one second (1 s), so that the refresh rate of the array substrate reaches 120 Hz. If 1126 rows of the pixel units are arranged on the array substrate, the turn-on duration for each row of the pixel units is $(\frac{1}{120})/(1126/2)$ s (approximately equivalent to 14.8 us) by progressive driving scan. It can be seen that, although the refresh rate of the array substrate according to the embodiments of the present invention is increased to 120 Hz for implementing the 3D display (equivalent to twice as the original refresh rate), a sufficiently long charging duration is ensured for the pixel electrodes, so that the image response time of the display device is sufficiently long, which results in that the image quality is ensured.

In the technical solutions of the present invention, the gates of the pixel units in even rows and odd rows are charged respectively by turning on the gate driving circuit at intervals. Therefore, the charging duration of the array substrate may be reduced, and it may improve the refresh rate of the display device while ensuring the charging duration of the pixel electrodes and implementing 3D displaying. Moreover, the pixel units in odd rows and even rows alternately receive the gate driving signal. When the pixel units in odd rows are displaying the image, the pixel units in even rows display in black. On the contrary, when the pixel units in even rows are displaying the image, the pixel units in odd rows display in black. The above may reduce the crosstalk phenomenon of the 3D displaying.

As illustrated in FIGS. 1 and 2, the embodiments also provide a 3D display device, comprising the array substrate as described above and its driving circuit. Here, the driving circuit may comprise: a first gate drive circuit 1, being configured to provide the gate scanning signal to a gate line corresponding to the $2k-1^{th}$ row of pixel units in the first time interval of the preset time period; and a second gate drive circuit 2, being configured to provide the gate scanning signal to a gate line corresponding to the $2k^{th}$ row of pixel units in the second time interval of the preset time period.

In the embodiments of the present invention, the display device may be a liquid crystal display, a liquid crystal TV, an OLED display, an OLED TV, an e-paper, a mobile phone, a tablet computer, and the like.

Figure 3:
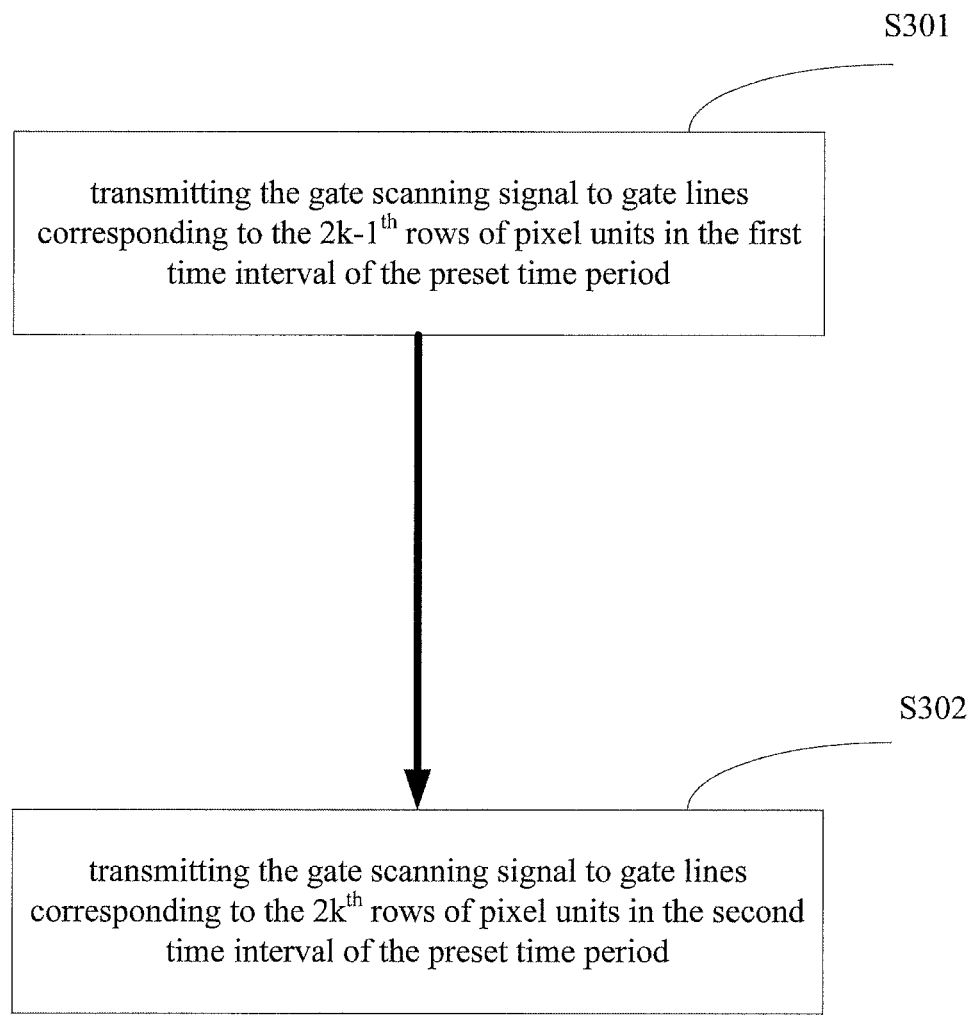
FIG. 3 illustrates a flow chart for a driving method for the 3D display device according to an embodiment of the present disclosure.

The embodiments of the present invention also provide a driving method for the 3D display device as described above, as shown in FIG. 3. And the driving method may comprise: transmitting the gate scanning signal to a gate line corresponding to the $2k-1^{th}$ row of pixel units in the first time interval of the preset time period (Step S301); and transmitting the gate scanning signal to a gate line corresponding to the $2k^{th}$ row of pixel units in the second time interval of the preset time period (Step S302).

Here, in the preset time period, the first time interval may precede the second time interval or the second time interval may precede the first time interval.

In the following, the 3D display device and the driving method of the present invention will be further explained in details in conjunction with FIGS. 1 and 2.

As illustrated in FIGS. 1 and 2, 2n rows and m columns of pixel units are formed on the array substrate of the 3D display device. The gate lines of the pixel units in $2k-1^{th}$ rows are coupled to the first gate driving circuit 1, i.e. the gate lines corresponding to the pixel units in odd rows are coupled to the first gate driving circuit 1; the gate lines corresponding to the pixel units in $2k^{th}$ rows are coupled to the second gate driving circuit 2, i.e. the gate lines corresponding to the pixel units in even rows are coupled to the second gate driving circuit 2. Here, n represents a natural number and k represents a natural number which is not less than 1 and not greater than n.

In the embodiments of the present invention, the length of the preset time period is set to substantially 1/60 s, and the time length of each of the first time interval and the second time interval is set to substantially 1/120 s for implementing the 3D displaying.

Figure 4:
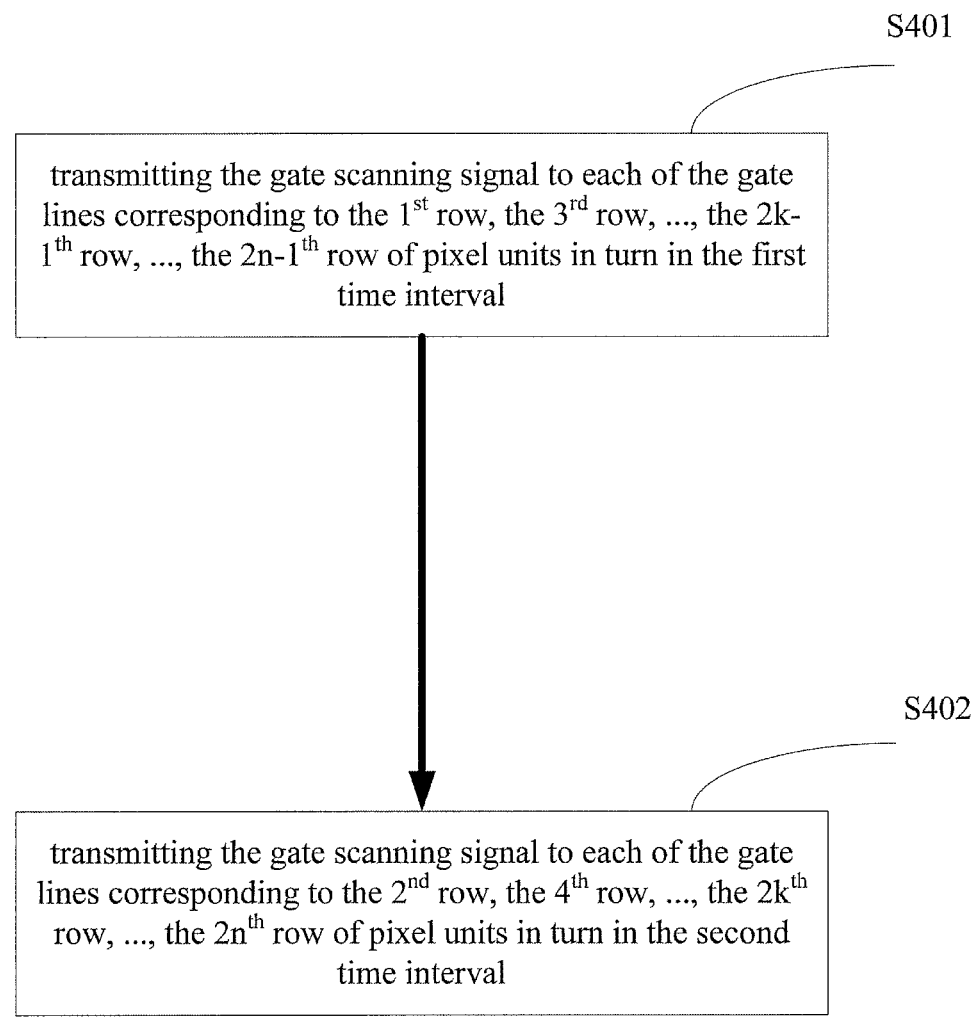
FIG. 4 illustrates another flow chart for a driving method for the 3D display device according to another embodiment of the present disclosure.

In another embodiment of the present disclosure, as shown in FIG. 4, in the first time interval of the preset time period, the image is provided to the left eye of the viewer by switching of the active shutter glasses, as illustrated in FIG. 1. During this time interval, the first gate driving circuit 1 progressively transmits the gate scanning signal to each of the gate lines corresponding to the $1^{st}$ row, the $3^{rd}$ row, . . . , the $2k-1^{th}$ row, . . . , the $2n-1^{th}$ row of pixel units in turn, and thus the image displaying by the pixel units in odd rows is implemented. In the meantime, the second gate driving circuit 2 does not operate, and does not transmit the gate scanning signal to gate lines corresponding to the $2^{nd}$ row, the $4^{th}$ row, . . . , the $2k^{th}$ row, . . . , the $2n^{th}$ row of pixel units, i.e. the display of the pixel units in even rows is in black (Step S401).

In the second time interval of the preset time period, the image is provided to the right eye of the viewer by switching of the active shutter glasses, as illustrated in FIG. 2. During this time interval, the second gate driving circuit 2 progressively transmits the gate scanning signal to each of the gate lines corresponding to the $2^{nd}$ row, the $4^{th}$ row, . . . , the $2k^{th}$ row, . . . , the $2n^{th}$ row of pixel units in turn, and thus the image displaying by the pixel units in even rows is implemented; In the meantime, the first gate driving circuit 1 does not operate, and does not transmit the gate scanning signal to gate lines corresponding to the $1^{st}$ row, the $3^{rd}$ row, . . . , the $2k-1^{th}$ row, . . . , the $2n-1^{th}$ row of pixel units, i.e. the display of the pixel units in odd rows is in black (Step S402).

In the above processes, the data drive circuit of the array substrate normally provides data signal to the data lines of the pixel units. However, the TFTs of the pixel units will not be turned on until the gate scanning signal is received by the gate lines corresponding to the pixel units. Therefore, the pixel units may not display an image, and display in black.

In the above solutions, the 3D display device may refresh the image 120 times within 1 s, so that the refresh rate of the 3D display device reaches 120 Hz. If 1126 rows of the pixel units are arranged on the array substrate of the 3D display device, the turn-on duration for each row of the pixel units is (1/120)/(1126/2) s (approximately equivalent to 14.8 us) by progressive driving scan. It can be seen that, although the refresh rate of the 3D display device of the present invention is increased to 120 Hz for implementing 3D display (equivalent to twice as the original refresh rate), a sufficiently long charging duration is ensured for the pixel electrodes, so that the image response time of the display device is sufficiently long, which results in that the image quality is ensured.

In the technical solutions of the present invention, the gates of the pixel units in even rows and odd rows are charged respectively by turning on the gate driving circuit at intervals, the charging duration of the 3D display device may be reduced, and it may improve the refresh rate of the display device while ensuring the charging duration of the pixel electrodes and implementing 3D displaying. Moreover, the pixel units in odd rows and even rows alternately receive the gate driving signal. When the pixel units in odd rows are displaying the image, the pixel units in even rows display in black. On the contrary, when the pixel units in even rows are displaying the image, the pixel units in odd rows display in black. Therefore, the above may reduce the crosstalk phenomenon of the 3D displaying.

The above descriptions are only preferred embodiments of the present invention. It should be noted that, for those ordinary skilled in the art, many modifications and polishes may be made without departure from the principles of the present invention, and these modification and polishes should also be deemed to be fallen into the protection scope of the present invention.

What is claimed is:
1. A three-dimensional (3D) display device, comprising:
    an array substrate comprising:
        a substrate;
        2n rows of pixel units disposed in an arrangement on the substrate in a matrix form;
        gate lines each of which corresponds to each row of the pixel units, wherein each of the gate lines is coupled to gate electrodes of thin film transistors (TFTs) in corresponding pixel units; and a driving circuit configured to transmit the gate scanning signal to each of the gate lines corresponding to the $1^{st}$ row, the $3^{rd}$ row, ..., the $2k-1^{th}$ row, ..., the $2n-1^{th}$ row of pixel units in turn and not to transmit the gate scanning signal to the gate lines corresponding to the $2^{nd}$ row, the $4^{th}$ row, the $2k^{th}$ row, ..., the $2n^{th}$ row of pixel units in a first time interval of the preset time period, such that the display of the pixel units in the $2^{nd}$ row, the $4^{th}$ row, ..., the $2k^{th}$ row, ..., the $2n^{th}$ row is in black; to transmit the gate scanning signal to each of the gate lines corresponding to the $2^{nd}$ row, the $4^{th}$ row, ..., the $2k^{th}$ row, ..., the $2n^{th}$ row of pixel units in turn and not to transmit the gate scanning signal to the gate lines corresponding to the $1^{st}$ row, the $3^{rd}$ row, ..., the $2k-1^{th}$ row, ..., the $2n-1^{th}$ row of pixel units in a second time interval of the preset time period, such that the display of the pixel units in the $1^{st}$ row, the $3^{rd}$ row, ..., the $2k-1^{th}$ row, ..., the $2n-1^{th}$ row is in black, where n is a natural number and k is a natural number which is not less than 1 and not greater than n, wherein a turn-on duration for each row of the pixel units within the 2n rows of pixel units is 14.8 us, and wherein a time length of each of the first time interval and the second time interval is substantially $1/120$ s;

wherein either left-eye images or right-eye images are displayed within the whole first time interval, while the remaining images are displayed within the whole second time interval;

wherein the driving circuit comprises: a first gate drive circuit, being configured to provide the gate scanning signal to gate lines corresponding to the $2k-1^{th}$ rows of pixel units in the first time interval of the preset time period; and a second gate drive circuit, being configured to provide the gate scanning signal to gate lines corresponding to the $2k^{th}$ rows of pixel units in the second time interval of the preset time period.

2. The 3D display device according to claim 1, wherein, the gate lines corresponding to the $2k-1^{th}$ rows of pixel units are coupled to the first gate driving circuit; the gate lines corresponding to the $2k^{th}$ rows of pixel units are coupled to the second gate driving circuit.

3. The 3D display device according to claim 1, wherein, within the preset time period, the first time interval precedes the second time interval, or the second time interval precedes the first time interval.

4. A driving method for a three-dimensional (3D) display device, comprising an array substrate and a driving circuit, wherein the array substrate comprises:
a substrate;
2n rows of pixel units being arranged on the substrate in a matrix form; and
gate lines each of which corresponds to each row of the pixel units, wherein each of the gate lines is coupled to gate electrodes of thin film transistors (TFTs) in corresponding pixel units for receiving a gate scanning signal; with the driving method comprising:

transmitting, by the driving circuit, the gate scanning signal to each of the gate lines corresponding to the $1^{st}$ row, the $3^{rd}$ row, ..., the $2k-1^{th}$ row, ..., the $2n-1^{th}$ row of pixel units in turn, while not transmitting the gate scanning signal to the gate lines corresponding to the $2^{nd}$ row the $4^{th}$ row, ..., the $2k^{th}$ row, ..., the $2n^{th}$ row of pixel units in a first time interval of the preset time period such that the display of the pixel units in the $2^{nd}$ row, the $4^{th}$ row, ..., the $2k^{th}$ row, ..., the $2n^{th}$ row is in black; and transmitting, by the driving circuit, the gate scanning signal to each of the gate lines corresponding to the $2^{nd}$ row, the $4^{th}$ row, ..., the $2k^{th}$ row, ..., the $2n^{th}$ row of pixel units in turn, while not transmitting the gate scanning signal to the gate lines corresponding to the $1^{st}$ row, the $3^{rd}$ row, ..., the $2k-1^{th}$ row, ..., the $2n-1^{th}$ row of pixel units in a second time interval of the preset time period, such that the display of the pixel units in the $1^{st}$ row, the $3^{rd}$ row, ..., the $2k-1^{th}$ row, ..., the $2n-1^{th}$ row is in black, where n is a natural number and k is a natural number which is not less than 1 and not greater than n, wherein a turn-on duration for each row of the pixel units within the 2n rows of pixel units is 14.8 us;

wherein a time length of each of the first time interval and the second time interval is substantially $1/120$ s;

wherein either left-eye images or right-eye images are displayed within the whole first time interval, while the remaining images are displayed within the whole second time interval;

wherein the driving circuit comprises: a first gate drive circuit, being configured to provide the gate scanning signal to gate lines corresponding to the $2k-1^{th}$ rows of pixel units in the first time interval of the preset time period; and a second gate drive circuit, being configured to provide the gate scanning signal to gate lines corresponding to the $2k^{th}$ rows of pixel units in the second time interval of the preset time period.

5. The driving method for the 3D display device according to claim 4, wherein, within the preset time period, the first time interval precedes the second time interval, or the second time interval precedes the first time interval.

* * * * *